Nov. 6, 1951  J. HECK  2,574,262
VALVE WITH BUILT-IN OPERATING CYLINDER
FOR PRESSURE FLUID OPERATIONS
Filed May 25, 1946  3 Sheets-Sheet 1

INVENTOR:
Joseph Heck.
BY
K. A. Mayr.
Attorney.

Patented Nov. 6, 1951

2,574,262

UNITED STATES PATENT OFFICE 2,574,262

VALVE WITH BUILT-IN OPERATING CYLINDER FOR PRESSURE FLUID OPERATIONS

Joseph Heck, New York, N. Y., assignor of one-half to Hugo C. Gollmer, New York, N. Y.

Application May 25, 1946, Serial No. 672,258

4 Claims. (Cl. 137—139)

The present invention relates to pressure fluid operated valves, more particularly gate valves.

An object of the invention is to provide a pressure fluid operated valve whereby the hydraulic cylinder is disposed within the valve unit thereby greatly reducing the over all size of the valve with its pressure fluid actuated mechanism.

Another object of the present invention resides in the provision of a pressure fluid operated valve in which the operating cylinder is formed within the valve closing member and the operating piston is stationary and disposed within said member.

An object of the invention is the provision of a pressure fluid operated gate valve in which a cylinder adapted to be filled with and emptied of pressure fluid is disposed within the valve chamber or bonnet and forms a guide for the closing member.

A further object of the invention is the provision of valves of the type set forth above in which the stuffing box is disposed within the valve chamber and provided with adjusting means which are accessible and operable from the outside of the valve chamber.

A further object of the invention resides in the provision of valves as set forth above and comprising valve position indicating means having indicator means disposed and readable outside of the valve chamber.

Further and other objects of the present invention will be hereinafter set forth in the accompanying specification and claims and shown in the drawings which, by way of illustration, show what I now consider to be preferred embodiments of my invention.

Figure 1:
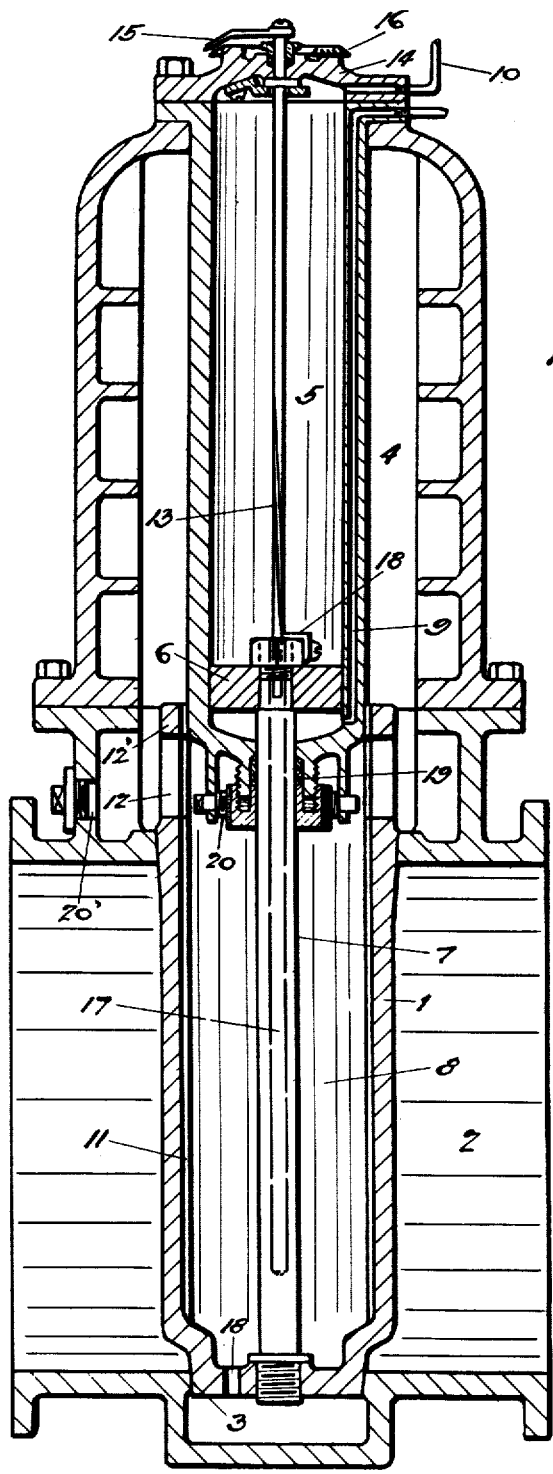
Fig. 1 is a longitudinal sectional view of a gate valve according to the invention.

Referring more particularly to Fig. 1 of the drawing, the closing member or gate 1 operates in a valve body comprising a valve casing 2 and a valve chamber or bonnet 4. It is shown seated on the seat 3 and adapted to move into the valve bonnet chamber 4 when it is desired that the valve be opened. A hydraulic cylinder 5 is disposed within chamber 4 and a piston 6 is disposed within the cylinder 5. The valve 1 has a cavity 8 adapted to receive cylinder 5. The piston 6 is connected to the upper end of a valve stem 7 which extends through stuffing box 19, provided at the bottom of cylinder 5, into the cavity 8. The lower end of the stem 7 is connected with the bottom portion of the closing member 1 which also forms the bottom of cavity 8.

For operating the valve, as for example to open, pressure fluid is introduced through a conduit 9 provided in the wall of cylinder 5 into the cylinder portion below piston 6. This causes the piston and valve member connected thereto to move upward whereby pressure fluid is removed through conduit 10 from the cylinder chamber on top of piston 6. To close the valve, pressure fluid is introduced through conduit 10 and relieved through conduit 9.

For relieving water or other fluid negotiated by the gate valve which collects in the cavity 8 grooves 11 are provided on the interior wall of cavity 8 which grooves communicate with the holes 12 arranged in a cylindrical upper portion 12' of closing member 1. Instead of the grooves 11, or in addition thereto, an opening 18 may be provided in the bottom of cavity 8.

A rifled spindle 13 extends through the center of cylinder 5 and is revolvably connected with the top 14 thereof. The upper end of spindle 13 extends through the head 14 of cylinder 5 to the outside thereof and is provided with an indicator arm 15, the angular position of which is determined by reading a graduation on a dial 16. Spindle 13 extends into bore 17 provided in valve stem 7. A rifle engaging member or finger 18 is provided on top of stem 7 causing the spindle 13 to revolve upon reciprocating movement of piston 6 in cylinder 5 and of the valve closing member. The extent of rotation of spindle 13 is a measure for the extent of travel of gate 1.

The stuffing box 19 can be adjusted, for example tightened, by operating a worm gear 20. This can be done by inserting a suitable tool or key through hand hole 20' which is covered when the valve is in operating condition.

Figure 2:
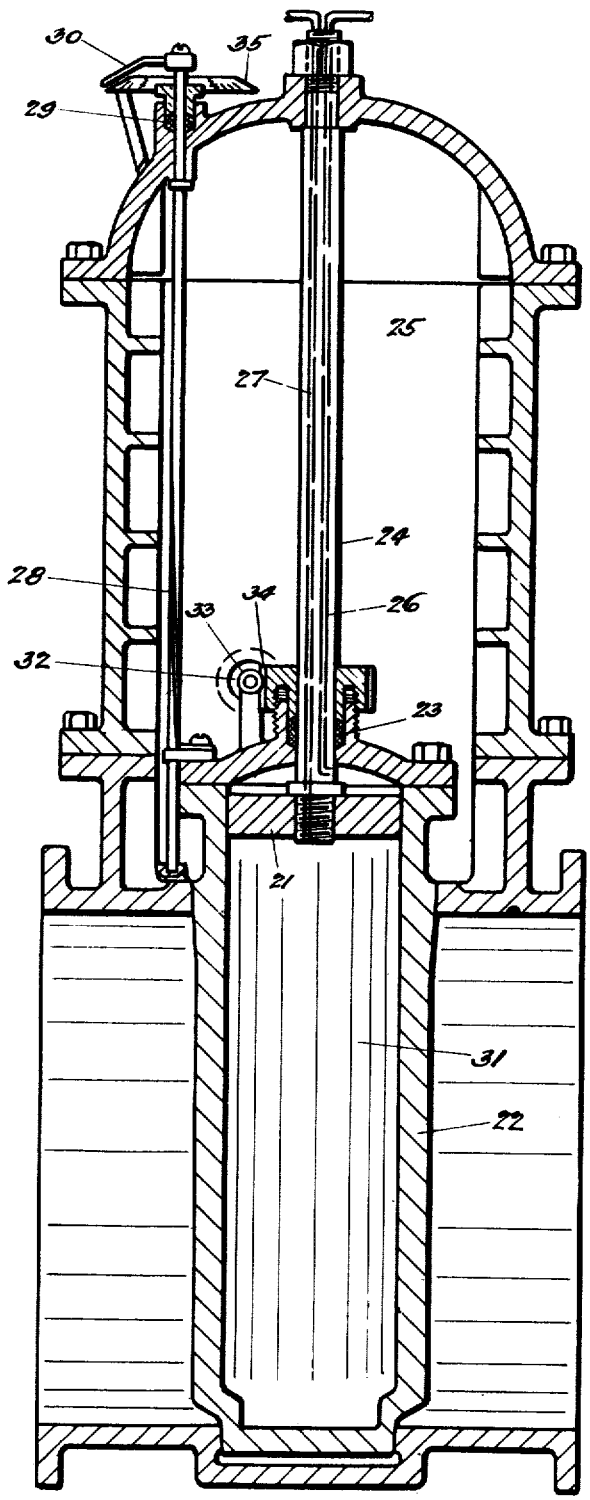
Fig. 2 is a longitudinal sectional view of a modified gate valve according to the invention.

Fig. 2 illustrates a modified valve according to the invention. In this case the hydraulic piston 21 operates in a bore 31 in gate 22 which bore is covered on top by a cylinder head and provided with a stuffing box 23 through which stem member 24, which is rigidly connected with piston 21, extends into the bonnet 25. Stem 24 is rigidly connected with the top of chamber or bonnet 25 and is stationary, as is piston 21. When the valve is closed, the stuffing box can be tightened by inserting a suitable tool through the normally closed hand hole 32 and rotating worm 33 of the worm gear 33, 34.

For operating the valve, which is shown in closed position in Fig. 2, as for example to open same, pressure fluid is introduced into the portion of cylinder 31 on top of piston 21, through conduit 26 in the stem 24 and fluid is removed from the portion of cylinder 31 below piston 21 through conduit 27 also disposed in stem 24.

For indicating the position of the gate 22 a rifled spindle 28 is disposed in chamber 25 and rotatably connected therewith. It has an upper end portion extending through a stuffing box 29 to the outside and carrying an indicator arm 30 which is associated with a dial 35.

Figure 3:
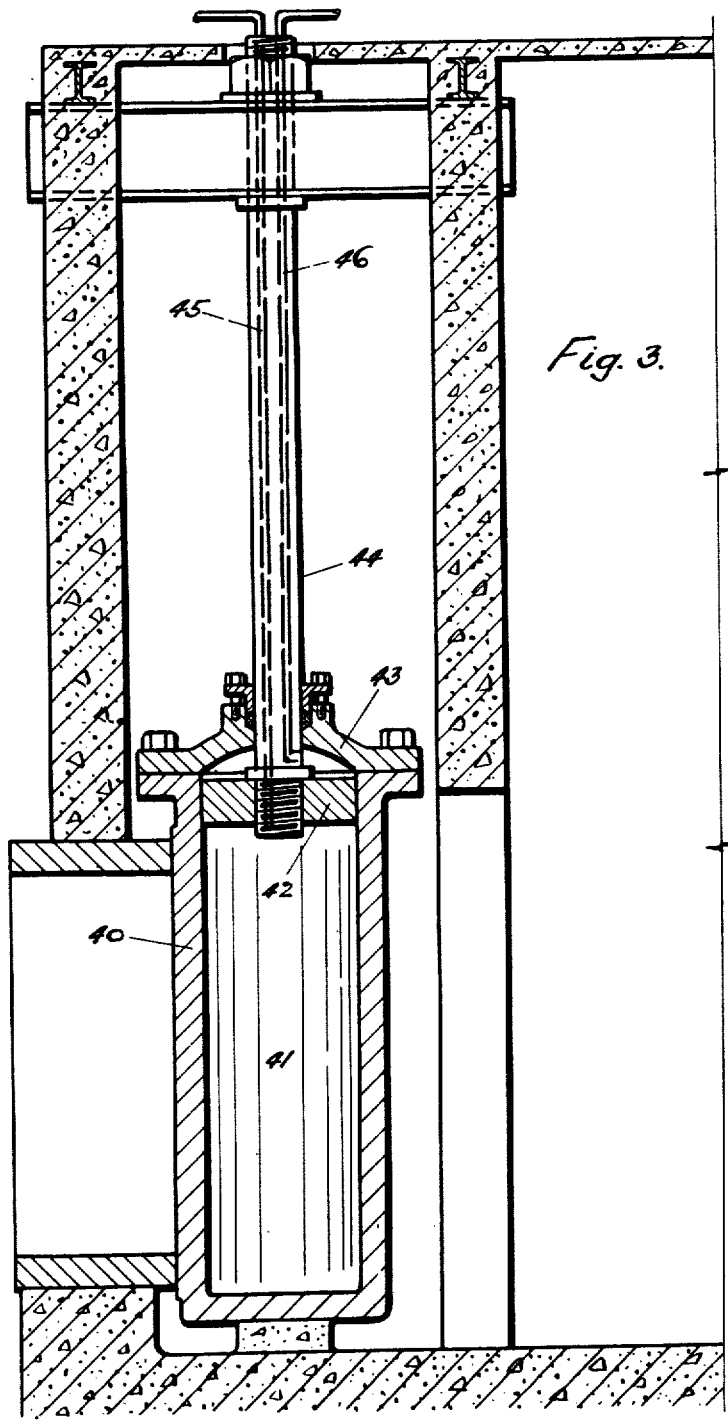
Fig. 3 is a sectional view of a sluice-gate according to the invention.

Fig. 3 illustrates a sluice-gate 40 for pressure fluid operation constructed according to the invention. The sluice-gate is provided with one or more cavities 41 forming the cylinder or cylinders for the hydraulic piston or pistons 42. The cylinder is covered by a cylinder head 43 having a stuffing box and a piston rod 44 extending therethrough. As in the modification shown in Fig. 2 two conduits 45 and 46 are provided in rod 44, one terminating below and one above piston 42. Both conduits extend to the upper portion of rod 44 and are individually connected with a pressure fluid supply and discharge system. The mechanism according to Fig. 3 is operated in the same way as that shown in Fig. 2.

While I believe the above described embodiments of my invention to be preferred embodiments, I wish it to be understood that I do not desire to be limited to the exact details of design and construction shown and described, for obvious modifications will occur to a person skilled in the art.

I claim:

1. A pressure fluid operated valve comprising a valve body, a valve closing member within said body, valve operating pressure fluid actuated means disposed within said body and comprising cylinder means having a stuffing box, piston means within said cylinder means, and a piston rod connected with said piston means and extending through said stuffing box, and stuffing box operating means connected with said stuffing box and disposed within said valve body and being accessible and operable from the outside of said valve body.

2. A pressure fluid operated gate valve comprising a valve casing, a valve closing member disposed in said valve casing when the valve is closed, a bonnet chamber disposed outside of and adjacent to said casing and adapted to receive said member when the valve is opened, hollow cylinder means disposed within said chamber, and a pressure fluid operated piston slidable in said cylinder means and connected with said member.

3. A pressure fluid operated gate valve comprising a reciprocatingly movable valve closing member, a valve casing, a bonnet chamber connected with and disposed outside of and adjacent to said casing and adapted to receive said member when the valve is opened, hollow cylindrical means connected with and disposed in said chamber, a cylindrical cavity within said member conforming with a said cylinder means and adapted to receive said cylindrical means upon movement of said member into said chamber, a pressure fluid actuated piston slidable in said cylindrical means and rigidly connected with said member, and pressure fluid conduit means in said cylindrical means communicating with the outside of said chamber and supplying pressure fluid thereinto and relieving it therefrom for operating said piston.

4. A pressure fluid operated gate valve comprising a reciprocatingly movable valve closing member, a valve casing, a bonnet chamber connected with and disposed outside of and adjacent to said casing and adapted to receive said member when the valve is opened, hollow cylindrical means connected with and disposed in said chamber, a cylindrical cavity within said member conforming with said cylindrical means and adapted to receive said cylindrical means upon movement of said member into said chamber, said cavity having a bottom portion, and a pressure fluid actuated piston slidable in said cylindrical means and rigidly connected with said bottom portion.

JOSEPH HECK.

REFERENCES CITED

The following references are of record in the file of this patent:

UNITED STATES PATENTS

| Number | Name | Date |
|---|---|---|
| 845,063 | Desper | Feb. 26, 1907 |
| 1,300,327 | Benjamin | Apr. 15, 1919 |
| 1,483,991 | Slattery | Feb. 19, 1924 |
| 2,178,123 | Quick | Oct. 31, 1939 |
| 2,386,413 | Walker | Oct. 9, 1945 |

FOREIGN PATENTS

| Number | Country | Date |
|---|---|---|
| 26,452 | Norway | Nov. 22, 1915 |

Certificate of Correction

Patent No. 2,574,262                                                          November 6, 1951

JOSEPH HECK

It is hereby certified that error appears in the above numbered patent requiring correction as follows:

In the grant, line 6, in the heading to the drawings, sheets 1, 2 and 3, line 3, and in the heading to the printed specification, line 3, title of invention, for the word "OPERATIONS" read *OPERATION*; and that the said Letters Patent should be read as corrected above, so that the same may conform to the record of the case in the Patent Office.

Signed and sealed this 8th day of April, A. D. 1952.

[SEAL]

THOMAS F. MURPHY,
*Assistant Commissioner of Patents.*